June 13, 1967 W. E. GOOD ET AL 3,325,592

COLOR PROJECTION SYSTEM

Filed May 8, 1964 5 Sheets-Sheet 1

INVENTORS:
WILLIAM E. GOOD,
THOMAS T. TRUE,

BY Julius J. Zaskalicky
THEIR ATTORNEY.

COLOR PROJECTION SYSTEM

Filed May 8, 1964 5 Sheets-Sheet 2

INVENTORS:
WILLIAM E. GOOD,
THOMAS T. TRUE,
BY Julius J. Zaskalicky
THEIR ATTORNEY.

INVENTORS:
WILLIAM E. GOOD,
THOMAS T. TRUE,
BY Julius J. Zaskalicky
THEIR ATTORNEY.

INVENTORS:
WILLIAM E. GOOD,
THOMAS T. TRUE,
BY [signature]
THEIR ATTORNEY.

INVENTORS:
WILLIAM E. GOOD,
THOMAS T. TRUE,
BY Julius J. Zaskalicky
THEIR ATTORNEY.

United States Patent Office 3,325,592

Patented June 13, 1967

3,325,592

COLOR PROJECTION SYSTEM

William E. Good, Liverpool, and Thomas T. True, Camillus, N.Y., assignors to General Electric Company, a corporation of New York Filed May 8, 1964, Ser. No. 366,005
1 Claim. (Cl. 178—5.4)

The present invention relates to improvements in systems for the projection of images of the kind including a light modulating medium formable into diffraction gratings by electron charge deposited thereon in accordance with electrical signals corresponding to the images.

In particular, the invention relates to the projection of color images using a common area of the viscous light modulating medium and a common electron beam to produce deformations in the medium for simultaneously controlling therein point by point the primary color components in kind and intensity in a beam of light in response to a plurality of simultaneous electrical signals, each deformation corresponding point by point to the intensity of a respective primary color component of an image to be projected by such beam of light.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of oil in which the electron beam forms phase diffraction gratings having adjacent valleys spaced apart by a predetermined distance. Each portion of light incident on a respective small area or point of the medium is deviated in a direction orthogonal to the direction of the valleys. The intensity of the deviated light is a function of the depth of the valleys.

The phase diffraction grating may be formed in a layer of oil by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations in the period of scan are changed in amplitude the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of white light, which is constituted of primary color components of light, is directed on a diffraction grating, light impinging therefrom is dispersed into a series of spectra on each side of a line representing the direction or path of the undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelength of red light to the line to line spacing of the grating is equal to the sine of the angle, and so on.

If the beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portion. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light passed by the color pencil. The apertures in a light output mask are of predetermined extent and at locations in order to selectively pass the primary color components of the diffraction spectrum. The line to line spacings of each of the three primary diffraction gratings determines the width and location of the cooperating slot to pass the respective primary color component when a diffraction grating corresponding to that color component is formed in the light modulating medium.

In the kind of system under consideration, an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green and red, and the carrier frequency associated with each of these colors is proportionately lower, the deviation in the first order spectrum of the blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color component. Projection of such a beam reconstitutes in color the image corresponding to the electrical signals.

When three diffraction gratings are formed simultaneously on a common area of the light modulating medium each having lines extending in the same direction, beat gratings are produced which have an adverse effect on the efficiencies of the color channels of the system and also upon the purity of primary color light passed by each of the channels whereby the reproduction of the color image is deleteriously affected. Such problems are partly resolved in a system in which one of the diffraction gratings has lines orthogonal to the direction of the lines of the other two diffraction gratings. Such a system is described and claimed in U.S. Patent 3,078,338, W. E. Glenn, Jr., assigned to the assignee of the present invention. The problem of the adverse effects of beats is now simplified in that only two primary gratings have lines extending in the same direction. Such problem is resolved by appropriate arrangement of the elements of the system and their mode of operation as more fully described and claimed in a copending application Ser. No. 343,990, filed Feb. 11, 1964, and assigned to the assignee of the present invention.

Preferably, in the latter described system the one grating lines correspond in direction to the direction of horizontal scan, and the line to line spacing correspond to the line to line spacing in a field of scan. Of course, the lines of the other diffraction gratings would be perpendicular or orthogonal to the lines of the one grating. In such a system it has been found advantageous to form the gratings corresponding to the red and blue primary color components with lines orthogonal to the direction of horizontal scan, and to utilize the grating formed by the lines of horizontal scan for control of the green color component in the image. In accordance with the above described mode of formation of the various diffraction gratings of the system the carrier frequency of the red component is set at approximately 16 megacycles, the carrier frequency of the blue component is set at approximately 12 megacycles, and the carrier frequency of the green component is set at approximately three times the carrier frequency of the red component, i.e., 48 megacycles. While the above described arrangements in a simultaneous superimposed grating system solve such basic problems as light efficiency, and color purity in the various color channels, numerous other problems arise in respect to formation of spurious images of various forms and intensities which seriously degrade the projected image. Such spurious images take the form of streaks, herringbone patterns, fine bar structures, fine cross hatch patterns, and the like. We have found that in large measure such problems arise from the fact that a single electron beam is controlled by a plurality of voltages including a field scanning voltage of 60 cycles, a line scanning voltage of nominally 15,750 cycles, video signals having frequencies up to four megacycles, red and blue component carrier frequencies of 16 and 12 megacycles, respectively, and a green component carrier frequency of 48 megacycles, to deposit charge on an area of a light modulating medium to produce deformations therein which form the plurality of particularly oriented diffraction gratings mentioned above. Such problems are compounded by the existence of nonlinearities of the system, in particular, the nonlinear relationship between the voltages producing variations in charge distribution in the media and the corresponding depth of deformations.

We have found that when either the red or blue carrier wave phase at the initiation of each line of scan varies from line to line the vertically aligned deposits of charge forming the lines of the red diffraction or blue diffraction gratings are not aligned in a field or in successive fields, a tearing or striking of the primary colors in the projected image results. We have found that a similar effect of a herringbone pattern results when the phase of the green carrier wave at the initiation of horizontal scan varies from line to line.

It has been mentioned that typically the frequency of the red carrier wave is 16 megacycles, the frequency of the blue carrier wave is 12 megacycles. The difference beat of these carrier waves is approximately 4 megacycles. We have selected the frequencies of these carrier waves such that the difference of beat frequency is higher than the highest video frequency utilized in the system to avoid striation patterns in the projected image.

We have found that because of nonlinearities in the relationship of deforming force to resultant deformation in the light modulating medium, and consequent resultant intensity of light passed through the medium, harmonic waves of the fundamental grating waves are formed. When the carrier frequencies of the red and blue carrier wave are allowed to drift, the difference or beat frequency of the harmonic grating waves of these carrier waves may exceed the 15,750 cycle per second horizontal scan rate in frequency, and accordingly such beat waves would result in the appearance of striations in the projected image. We have also found that such striation effects also result when the harmonics of the red or blue carrier wave beat with much higher frequency green carrier wave.

We have found that even when the red and blue carrier waves are set so that the difference in the fundamental frequencies lies outside the normal pass band of video frequencies that a fine checkered or cross hatched background pattern is formed. We have found that appropriate arrangement of the phase of one carrier wave with respect to the other carrier wave in a visual sense virtually eliminates such a pattern.

Accordingly, the present invention is directed to the provision of means in such systems as described above for the elimination of the deleterious image effects such as enumerated above in the images projected by such systems. In accordance with the present invention the carrier wave frequencies are selected in relation to one another, the stability thereof as well as their time relationship with respect to one another, and also with respect to the horizontal scanning wave, and to the field scanning wave to avoid such deleterious effects.

The novel features believed characteristic of the present invention are set forth in the appended claim. The invention itself, together with further objects and advantages thereof, may best be understood by reference to the following description taken in connection with the accompanying drawings in which:

FIGURE 1 is a schematic diagram of the optical and electrical elements of a system useful in explaining the present invention.

FIGURES 2A, 2C, and 2E are diagrammatic representations of the active area of the light modulating medium showing the horizontal scan lines and the location of charge with respect thereto for the various primary color channels of the system.

FIGURES 2B, 2D, and 2F are side views of the modulating medium of FIGURES 2B, 2D, and 2F, respectively, showing the deformations which the deposited charge produces thereon.

Figure 1:
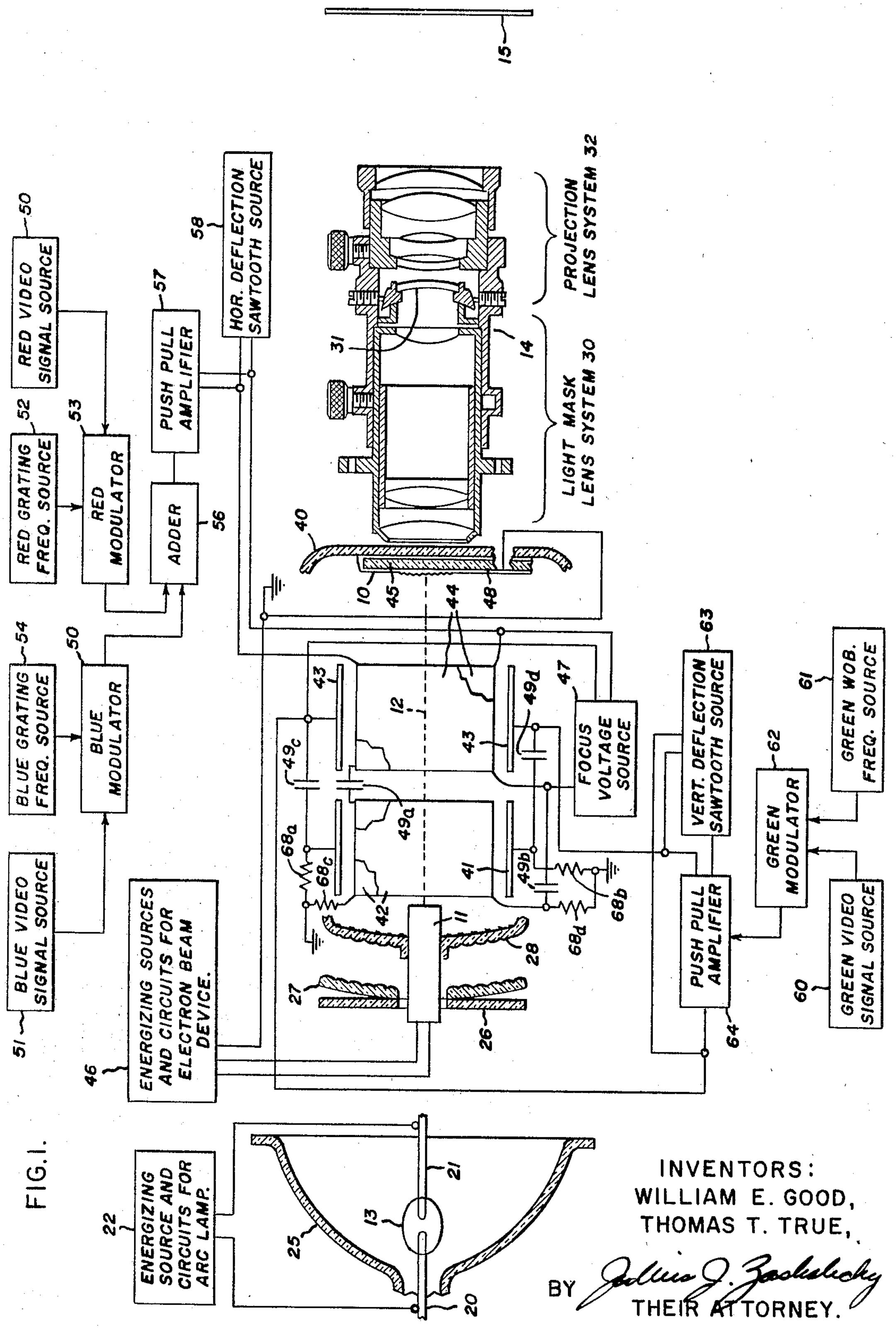

Referring now to FIGURE 1 there is shown a simultaneous color projection system comprising an optical channel including light modulating medium 10, and an electrical channel including an electron beam device 11, the electron beam 12 of which is coupled to the light modulating medium 10 in the optical channel. Light is applied from a souce of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured light mask and projection lens system 14 which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of a voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in the horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule of the first plate member onto the active area of the light modulating medium 10. With the arrangement described efficient utilization is made of light from the source, and also uniform distribution of light is produced on the light modulating medium. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 14, and is projected by the projection lens system 32 onto the screen 15. The details of the light input optics of the light valve projection system are shown in FIGURE 1 described in a copending patent application Serial No. 316,606, filed October 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Serial No. 336,505, filed January 8, 1964, and assigned to the assignee of the present invention.

According to present day monochrome and color television standards in force in the United States an image to be projected by a television system is scanned by a light-to-electrical signal converter horizontally once every $\frac{1}{15750}$ of a second, nominally, and vertically at a rate of one field of alternate lines every $\frac{1}{60}$ of a second. Correspondingly, an electron beam of a light producing or controlling device is caused to move at a horizontal scan frequency of 15,750 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2A:
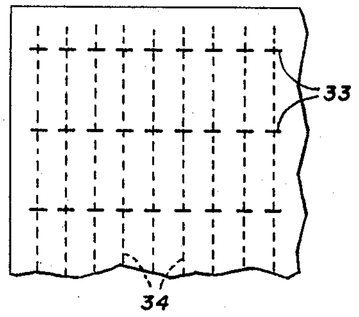
Figure 2B:
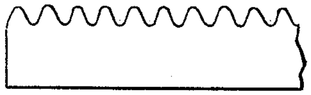

In FIGURE 2A is shown in schematic form a portion of such a raster in the light modulating medium along with the diffraction grating corresponding to the red color component. The size of the raster or whole area scanned in the embodiment is approximately 0.82 of an inch in height, and 1.10 of an inch in width. The horizontal dash lines 33 are the alternate scanning lines of the raster appearing in one of the two fields of a frame. The spaced vertically oriented dotted lines 34 on each of the raster lines, i.e., extending across the raster lines schematically represent concentrations of charge laid down by an electron beam to form the red diffraction grating in a manner to be described hereinafter. Such concentrations of charge occur at equally spaced intervals on each line and corresponding parts of each scanning line having similar concentrations thereby forming a series of lines of charge equally spaced from adjacent lines which cause the formation of valleys in the light modulating medium. The depth of such valleys, of course, depend upon the concentration of charge. Such a wave is produced by a signal superimposed on an electron beam moving horizontally at a frequency 15,750 cycles per second, a carrier wave, of smaller amplitude but of fixed frequency of the order of 16 megacycles per second thereby producing a line-to-line spacing in the grating of approximately 1/760 of an inch. The high frequency carrier wave velocity modulates the beam and causes the beam to move in steps. The result of such modulation is to produce a pattern of charge schematically depicted in this figure with each valley extending in the vertical direction and adjacent valleys being spaced apart by a distance determined by the carrier frequency as shown in greater detail in FIGURE 2B which is a side view of FIGURE 2A.

Figure 2C:
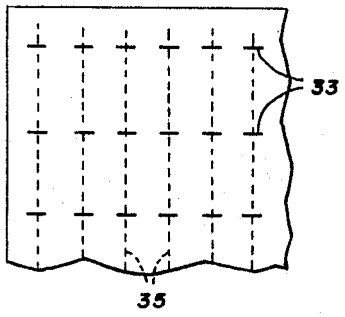
Figure 2D:
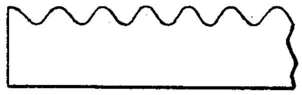

In FIGURE 2C is shown a section of the raster on which a blue diffraction grating has been formed. As in the case of the red diffraction grating, the vertically oriented dotted lines 35 of each of the electron beam scan lines 33 represent concentrations of charge laid down by the electron beam. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal wave is applied to produce a velocity modulating in the horizontal direction of the electron beam, thereby to lay down charges on each scan line that are uniformly spaced in accordance with the frequency of the modulating carrier. A suitable frequency is nominally 12 megacycles per second. For such a frequency the line to line spacing of the blue grating would be approximately 1/570 of an inch. In FIGURE 2D is shown a side view of the section of the light modulating medium showing the deformations produced in the medium in response to the aforementioned lines of charge.

Figure 2E:
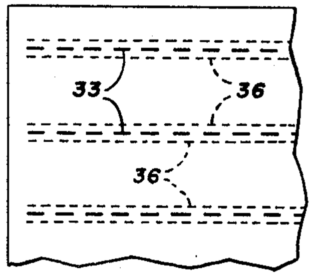
Figure 2F:
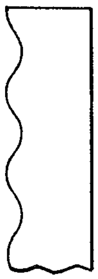

In FIGURE 2E is shown a section of the raster of the light modulating medium on which the green diffraction grating has been formed. In this figure are shown the alternate scanning lines 33 of a frame or adjacent lines of a field. On each side of the scanning lines are shown dotted lines 36 schematically representing concentrations of charge extending in the direction of the scanning lines to form a diffraction grating having lines or valleys extending in the horizontal direction. The green diffraction grating is controlled by modulating the electron scanning beam at very high frequency, nominally 48 magacycles, in the vertical direction, i.e., perpendicular to the direction of the lines, to produce a uniform spreading out or smearing of the charge transverse to the scanning direction of the beam. The amplitude of the smear in such direction varies proportionately with the amplitude of the high frequency carrier signal, the amplitude of which in turn varies inversely with the amplitude of the green video signal. The frequency chosen is higher than either the red or blue carrier frequency to avoid undesired interaction with signals of other frequencies of the system including the video signals and the red and blue carrier waves, as will be more fully explained below. With low modulation of the carrier wave more charge is concentrated in a line along the center of the scanning direction than with high modulation thereby producing a greater deformation in the light modulating medium at that part of the line. In short, the natural grating formed by the focussed beam represents maximum green modulation or light field, and the defocussing by the high frequency modulation spreads or smears such grating in accordance with the amplitude of such modulation. For good dark field the grating is virtually wiped out. FIGURE 2F is a sectional view of the light modulating medium of FIGURE 2E showing the manner in which the concentrations of charge along the adjacent lines of a field function to deform the light modulating medium into a series of valleys and peaks representing a phase diffraction grating.

Thus FIGURE 2 depicts the manner in which a single electron beam scanning the raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus by applying the three signals indicated, each simultaneously varying in amplitude in accordance with the intensities of a respective primary color component of the image to be projected, three primary diffraction gratings are formed, the point by point amplitudes of which vary with the intensity of a respective color component.

As used in this specification with reference to the specific raster area of the light modulating medium, a point represents an area of the order of several square mils (a mil is one thousandth of an inch) and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, in a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W.E. Glenn, Jr., assigned to the same assignee as the present invention.

When a pair of phase diffraction gratings such as those described are simultaneously formed and superimposed in a light modulating medium, inherently another diffraction grating, referred to as the beat frequency grating, is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence such light is blocked by the output mask having apertures set up on the basis of considerations outlined in the previous paragraph. Such blockage represents impairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point the relative intensity of each of three primary color components in a beam of light, inevitably two of the phase gratings must be formed in a manner to have lines or valleys, or components thereof, extending in the same direction. The manner in which such effects can be avoided are described and claimed in the aforementioned copending patent application, Serial No. 343,990, filed February 11, 1964, and assigned to the assignee of the present invention.

Referring again to FIGURE 1, an electron writing system is provided for producing the phase diffraction gratings in the light modulating medium, and comprises an evacuated enclosure 40 in which are included an electron beam device 11 having a cathode (not shown), a control electrode (not shown), and a first anode (not shown), a pair of vertical deflection plates 41, a pair of horizontal deflection plates 42, a set of vertical focus and deflection electrodes 43, a set or horizontal focus and deflection electrodes 44, and the light modulating medium 10. The cathode, control electrode, and first anode along with the transparent target electrode 48, supporting the light modulating medium 10 and connected to ground, are energized from a source 46 to produce in the evacuated enclosure an electron beam that at the point of focussing on the light modulating medium is of small dimension (a fraction of a mil), and of low current (a few micro-amperes), and high voltage. Electrodes 41 and 42 connected to ground through respective high impedances **68*a*, 68*b*, 68*c*, and 68*d* provide a deflection and focus function, but are less sensitive to applied deflection voltages than electrodes 43 and 44. The electrodes 43 and 44** control both the focus and deflection of the electron beam in the light modulating medium in a manner to be explained more fully below.

A pair of carrier waves which produce the red and blue gratings, in addition to the horizontal deflection voltage are applied to the horizontal deflection plates 42 and 44. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 and 43 to spread the beam out in accordance with the amplitude of the green video signal as explained above. The light modulating medium 10 is a fluid of appropriate viscosity and of charge decay characteristics on a transparent support member 45 coated with a transparent conductive layer adjacent the fluid, such as indium oxide. The electrical conductivity of the light modulating medium is so constituted that the amplitude of the diffraction gratings decay to a small value after each field of scan thereby permitting alternate variations in amplitude of the diffraction grating at the sixty cycle per second field scanning rate. The viscosity and other properties of the light modulating medium are selected such that the deposited charges produce the desired deformations in the surface. The conductive layer is maintained at ground potential and constitutes the target electrode 48 for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal deflection plates 44. The output of horizontal deflection sawtooth source 58 is also applied to plates 44 and to plates 42 through capacitors **49*a* and 49*b***.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green viedo signal. The modulated carrier wave and the output from the vertical deflection source 63 are applied to a conventional push-pull amplifier 64, the output of which is applied to vertical plates 43 to produce deflection of the electron beam in the manner previously indicated. The output of vertical deflection sawtooth source 63 is also applied to plates 43 and to plates 41 through capacitors **49*c* and 49*d***.

A circuit for accomplishing the deflection and focusing functions described above in conjunction with deflection and focusing electrode system comprising two sets of four electrodes such as shown in FIGURE 1 is shown and described in a copending patent application Ser. No. 335,117, filed Jan. 2, 1964, and assigned to the assignee of the present invention. An alternative electrode system and associated circuit for accomplishing the deflection and focussing function is described in the aforementioned copending patent application, Serial No. 343,990.

Figure 3A:
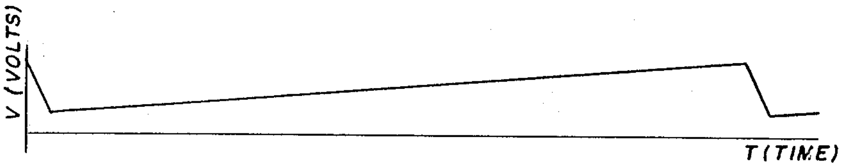
FIGURES 3A through 3F are graphical representations of voltages occurring at various points in the system of FIGURES 1 through 7 as a function of time useful in explaining the operation of the present invention.
Figure 3B:
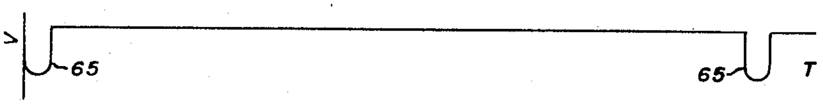
Figure 3C:
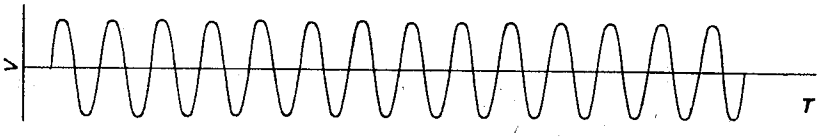
Figure 3D:
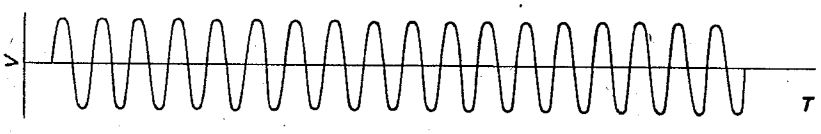
Figure 3E:
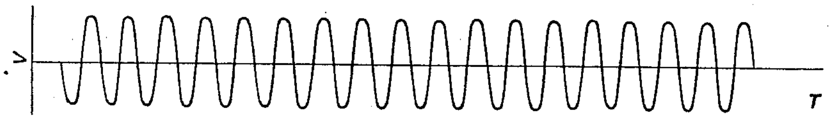
Figure 3F:
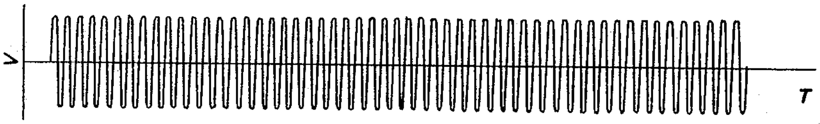

Referring now to FIGURES 3A through 3F there are shown diagrams of voltage versus time of the various waves which will be useful in connection with the apparatus of FIGURES 1 and 4 through 7 to explain the operation thereof in accordance with the present invention. FIGURE 3A shows the sawtoothed wave applied to the horizontal deflection plates of the apparatus of FIGURE 1 to produce horizontal scan of the electron beam thereof. FIGURE 3B shows the voltage wave utilized for horizontal blanking of the electron beam device during the electron beam retrace interval and also utilized in accordance with the present invention for the initiation of the train of waves shown in FIGURES 3C through 3F. The pulses 65 shown in FIGURE 3B are commonly referred to as the horizontal flyback pulses. FIGURE 3C shows the fixed frequency sine wave for forming the blue diffraction grating in the manner described above. FIGURE 3D shows the fixed frequency sine wave for forming the red diffraction grating in the manner described above, and similarly FIGURE 3E shows the fixed frequency sine wave identical to the wave of FIGURE 3D but reversed in phase and applied in a manner to be more particularly described below to avoid certain undesired effects in the system. FIGURE 3F shows the fixed frequency sine wave of voltage considerably higher in frequency than the frequency of the waves for the formation of the blue and red frequency gratings which functions to appropriately modulate the electron beam in the vertical direction to form diffraction gratings horizontally oriented and varying in depth in accordance with the amplitude of the video modulating signal.

It will be appreciated that the amplitudes of voltages in the various figures are shown identical for simplicity of illustration. In actual practice the voltage waves are of different amplitudes, for example, the horizontal deflection voltage wave may be several hundred volts in peak to peak amplitude, the fly-back pulse wave may be less than 100 volts and the various sinusoidal waves shown in FIGURES 3C through 3F may typically be less than 10 volts when used in such a system as described in FIGURE 1. Also the number of cycles shown in one line in the various FIGURES 3C through 3F corresponding, respectively, to the sinusoidal waves utilized in the blue, red and green gratings do not represent actual proportions but indicate the relative frequency relationships in general.

Figure 4:
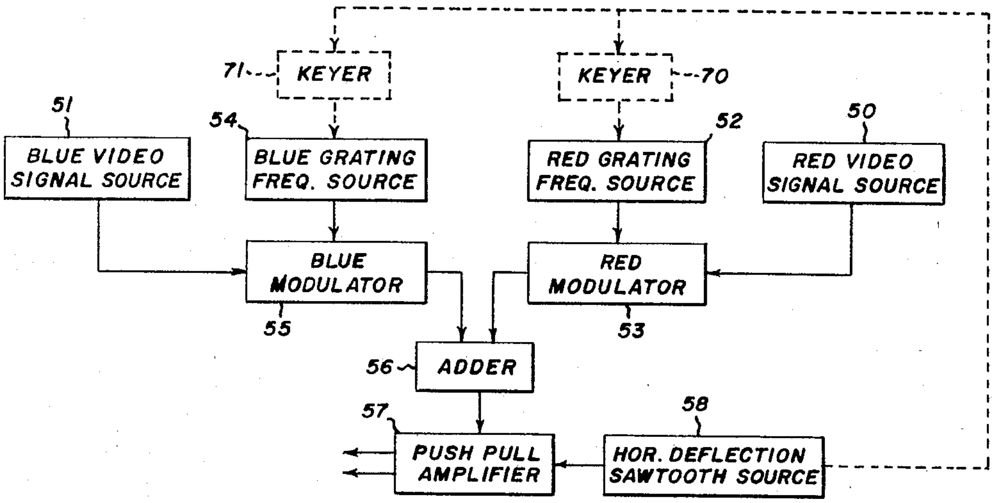
FIGURE 4 is a block diagram of a modification of the electrical portion of the system of FIGURE 1 in accordance with one aspect of the present invention.

It has been mentioned that in utilization of the apparatus of FIGURE 1 for the production of images or pictures that it is not uncommon for such pictures to have streaks extending in the direction of horizontal scan and having heights embracing several lines of scan. It has been found that such streaks are caused by differences in the phase of the carrier waves of either the red or blue frequency grating in one line with respect to an adjacent line. Such a problem is remedied by the circuit modifications shown in FIGURE 4 which represents in block form a modification of the circuits of FIGURE 1. In FIGURE 4 same reference numerals as used in FIGURE 1 are used to indicate identical elements and the essential modifications to the circuits of FIGURE 1 are indicated in FIGURE 4 in dotted blocks and dotted interconnections. More specifically, the modifications include the interposition of a keyer 70 between the horizontal deflection saw-tooth source 58 and the red grating frequency source 52, and a keyer 71 between the horizontal deflection sawtooth source 58 and the blue grating frequency source 54, respectively. In the operation of the circuit of FIGURE 4 the wave of FIGURE 3B derived from the horizontal saw-tooth source 58 is applied through keyer 70 to the red grating frequency source to initiate the output thereof shown in FIGURE 3D in which zero phase of the first cycle is coincident in time to the time of occurrence of the trailing edge of the fly-back pulses or initiation of the rise of horizontal sweep wave of FIGURE 3A. Similarly, the fly-back pulse from the horizontal deflection saw-tooth source 58 is applied to keyer 71 which initiates an output in the blue grating frequency source, such as shown in FIGURE 3C, in which zero phase of the first cycle is coincident to the trailing edge of the fly-back pulse 65. Keyed oscillator circuits which are responsive to keying pulses to develop an output which is initiated in time relationship thereto are old in the art, in general, and any number of such detail circuits could be used to perform the functions as explained above.

Figure 5:
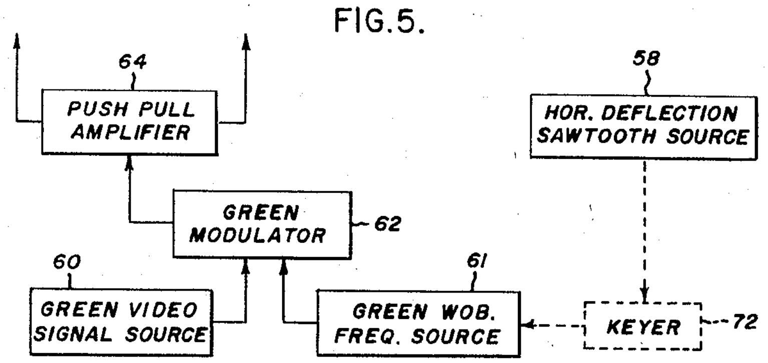
FIGURE 5 is a block diagram of a modification in the electrical portion of the system of FIGURE 1 in accordance with another aspect of the present invention.

In the operation of the apparatus of FIGURE 1 not only have streaks of brightness different from the brightness from the remainder of the picture on average extending in the horizontal direction been observed but also clusters of such streaks appearing at angle with respect to the horizontal and vertical dimensions of the picture in the form of herringbone patterns. Such deleterious effects have been diagnosed as a lack of phase coherence between the wave from the green wobbulating frequency source and the horizontal sweep wave of FIGURE 3A. Such deleterious effects have been eliminated by the circuit shown in block form in FIGURE 5. This figure shows a portion of the electrical circuits of FIGURE 1 in block form in which the modifications thereover are indicated in the form of dotted blocks and dotted interconnections. The same numerals are used in both figures for identical blocks. The additional function block provided in FIGURE 5 is designated a keyer 72 to which the horizontal fly-back pulse wave shown in FIGURE 3B is applied and which functions to initiate an output in the green wobbulating frequency source shown in FIGURE 3F in which zero phase of the initial cycle thereof corresponds to the trailing edge of the fly-back pulse 65 and to the time of initiation of the rising portion of the horizontal saw-toothed deflection wave of FIGURE 3A. It has been found that with the provision of such a function in the apparatus of FIGURE 1 that herringbone patterns of brightness were eliminated with considerable improvement in picture quality.

A circuit which would be suitable to function as the keyers 70, 71, and 72 of FIGURES 4 and 5 would be the circuit described and claimed in U.S. patent application Ser. No. 234,418, filed Oct. 31, 1962, and assigned to the assignee of the present invention.

It has been mentioned above in connection with the operation of the apparatus described in FIGURE 1 that striations are produced in the projected picture. Striations are lines of alternating intensity and/or hue which reoccur at intervals along the horizontal or vertical axis of the projected picture. This undesired effect in the projected picture has been found due to a shifting of one of the three primary color component carrier frequencies with respect to either or both of the other two carrier frequencies to produce a difference frequency greater than the 15,750 cycle per second scan frequency. Such shifts give rise to beat frequencies in the video frequency range of signals. As the various deflection electrodes are adjacent one another and as a common medium is utilized for the formation of the various gratings, it is a normal consequence for the various carrier frequencies to mix and produce resultant frequencies of the character indicated to produce the effects indicated. Also, nonlinear response of the elements of the system give rise to harmonics which beat with one another to produce frequencies which eventually appear in the form of striations in the projected image. For example, if the relationship of the red grating frequency to the carrier frequency of the blue grating is in the relationship of 4 to 3 nominally, and if the third harmonic of the red frequency and the fourth harmonic of the blue frequency are not identical, a beat frequency is produced which is dependent upon the departure of these frequencies from the 4 to 3 relationship. If the departure is greater than ¼ of the 15,750 per cycle rate then the resultant beat is greater than the aforementioned horizontal frequency scanning rate and hence would appear as part of the video display. Accordingly, it is quite important for the red and blue grating frequency sources to be maintained in stable relationship to one another. Also, it is important that the green wobbulating frequency source have an output in which the wave is in stable frequency relationship to each of the red and blue carrier waves. As the green carrier wave is much higher in frequency than either the red and blue, in order to avoid the production of beats with the harmonics of the red and blue carrier wave and the green carrier wave, an exact harmonic relationship has been set up, preferably, three times the frequency of the red carrier wave, or four times the frequency of the blue carrier wave, and so maintained.

Figure 6:
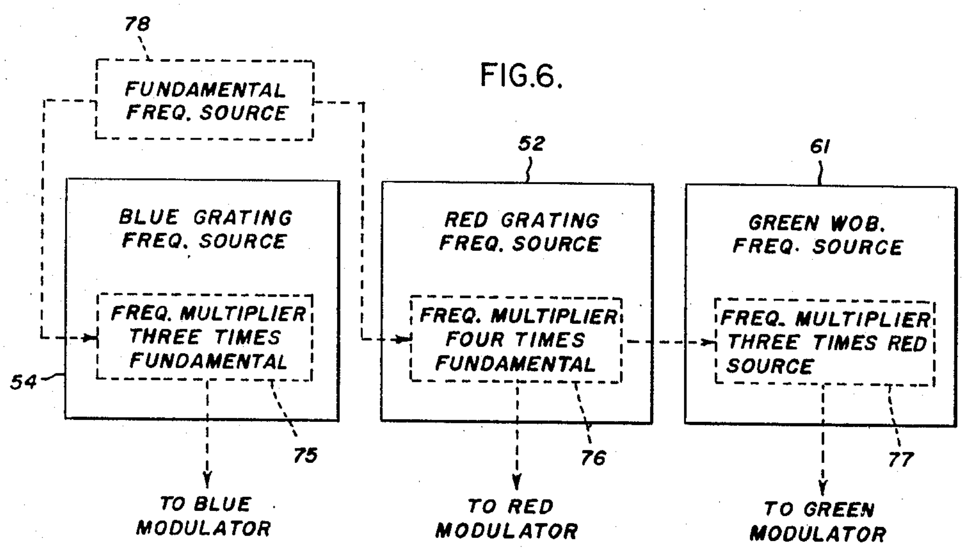
FIGURE 6 is a block diagram of a modification in the electrical portion of the system of FIGURE 1 in accordance with still another aspect of the present invention.

The relationships indicated above may be achieved by utilization of individual highly stable frequency source for the three carrier waves or may be accomplished by means of a fundamental frequency source and a series of frequency multipliers multiplying the frequency of the fundamental frequency source in the exact relations desired. The latter arrangement is shown in FIGURE 6. In this figure the same reference numerals as used in FIGURE 1 are used to indicate identical elements, and the essential elements in FIGURE 1 are indicated in dotted blocks and dotted interconnections in FIGURE 6. More specifically, the modifications include the provision of frequency multipliers 75, 76, and 77, in the blue grating frequency source 54, the red grating frequency source 52, and the green grating frequency source 61, respectively, and the provision of a fundamental frequency source 78. The frequency of the fundamental frequency source 78 is selected in one form of the embodiment of the invention to be ⅓ of the blue grating frequency source or ¼ of the red frequency source or $\frac{1}{12}$ of the green frequency source. Accordingly, the multiplier 75 is selected to triple the fundamental frequency source, the multiplier 76 is selected to quadruple the fundamental frequency source, and the multiplier 77 is selected to triple the output of the multiplier 76 of the red grating frequency source. In the alternative, the multiplier 77 of the green grating frequency source multipler could be driven from the multiplier 76 of the blue grating frequency source. However, when such an arrangement is utilized the multiplier of the green grating frequency source would then be a quadrupler. Accordingly, when the output of the fundamental frequency source 78 is applied to the blue grating frequency source multiplier, an output is obtained which is of the proper frequency to form the blue grating. Similarly, when the output of the fundamental frequency source is applied to the input of the multiplier 76, an output is obtained therefrom which is of proper frequency to form the red grating, and as the output of multiplier 76 drives the multiplier 77, the output thereof is of the proper frequency to appropriately modulate in depth the green grating. The fundamental frequency source 78 may be, for example, a keyed oscillator, such as described and claimed in patent application Ser. No. 234,418, filed Oct. 31, 1962, and assigned to the assignee of the present invention. Each of the frequency multipliers 52, 54, and 61 may be an amplifier with a tuned circuit tuned to the desired harmonic, fourth, third and third, respectively. The output of each of the multipliers would then be applied to the respective modulators as indicated in FIGURE 1. Of course, the amplifiers utilized should include short time constants so as to preclude any phase shifts in each of the carrier waves with respect to one another at the initiation of horizontal sweep.

Figure 7:
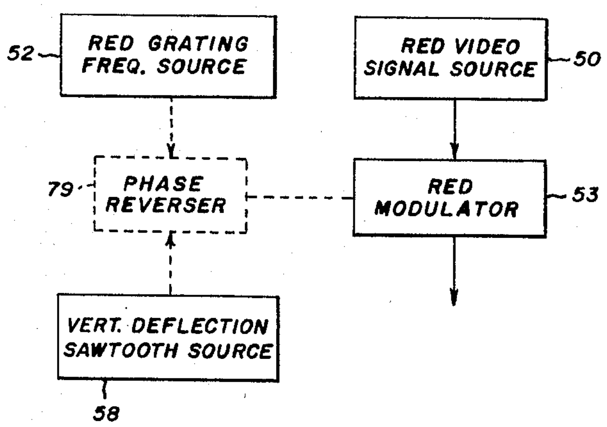
FIGURE 7 is a block diagram of a modification in the electrical portion of the system of FIGURE 1 in accordance with a further aspect of the present invention.

It has also been found in the operation of the apparatus of FIGURE 1 that the background of the pictures projected thereby have a finely sectioned or checkered pattern. Such background pattern has been found due to the beat frequency between the red and blue carrier frequencies. In the apparatus of FIGURE 1 the red frequency was selected nominally at 16 megacycles, and the blue carrier frequency at 12 megacycles; consequently, the difference or beat frequency of 4 megacycles would lie in the upper end of the video band of frequencies. Thus signals of such beat frequency appear as fine alternations of light and dark arranged in regular pattern along the horizontal direction of scan. By the modification of FIGURE 1 shown in FIGURE 7 such deleterious effects are eliminated. In FIGURE 7 is shown a portion of the blocks of the apparatus of FIGURE 1 in which the identical numerical designations denote the same blocks as in FIGURE 1, and in which the dotted blocks and dotted interconnections represent modifications in the block diagram thereof. The essential modification includes the phase reverser 79 which functions to reverse the phase of the red frequency source applied to the red modulator every other field so that, for example, on the even numbered fields, the red grating is formed by a carrier wave such as shown in grating is formed by a carrier wave such as shown in FIGURE 3E shifted 180 degrees in phase from the wave of FIGURE 3D. The effect of such mode of operation is to effectively double the frequency of the difference frequency pattern so as to eliminate it from view. While the red frequency source has been shown as shifted in phase from one to the opposite phase in successive lines, the blue grating frequency output could also have been so affected instead of the output of the red grating frequency source with equally satisfactory results. Phase reverser circuits which are responsive to a succession of pulses to alter the phase in succession from one phase to the opposite phase are known in the art. A suitable detail circuit for performing such function is described and claimed in copending patent application Ser. No. 323,975, filed Nov. 15, 1963, and assigned to the assignee of the present invention.

In the embodiments of the present invention described above the ratio of the red carrier frequency to the blue carrier frequency was set at 4 to 3, and the harmonic relationship of the green carrier frequency was preferably set at either four times the blue or three times the red carrier frequency. Such relationship of carriers avoids the harmonic beat pattern or striations referred to above. In the embodiments three times or twice the red carrier frequency, or twice the blue carrier frequency could have been used for the green carrier frequency to form a system in which the carrier frequencies of the green, red and blue would be in the relationship of 9 to 4 to 3, or 8 to 4 to 3, or 6 to 4 to 3, respectively; however, the likelihood of spurious patterns due to beat of the blue or red carrier harmonics with the green carrier would be greater. Also, the invention is applicable to systems in which the ratio of the carriers associated with the magenta channel are three to two. In such a system the green carrier frequency preferably is set at two times the higher carrier frequency or three times the lower carrier frequency associated with the magenta channel. The higher carrier frequency could be used to form the grating for either the red or blue color component. A green carrier frequency of four times the lower or three times the higher of the carrier frequencies of the magenta channel would also be suitable; however the likelihood of striations appearing in the display would be greater. It is desirable not to set the green carrier frequency at too high multiples of either the red or blue carrier frequency as it becomes progressively more difficult to couple such signals to the deflection plates.

While a red, blue, green primary color system was described in the illustrative embodiment set forth above, and specific colors were associated with specific ones of the three primary diffraction gratings, it will be appreciated that other primary color components may be used in accordance with the invention, and also may be assigned to different ones of the three primary gratings. To avoid the beat or striation effects described above the integral relationships of the carriers set forth above would be used.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

A system for simultaneously controlling point by point the intensity of each of a plurality of primary color components in a beam of light for projecting an image in color in response to respective electrical signals comprising:

(a) a transparent light diffracting medium deformable by electric charges deposited thereon, (b) means for directing said beam of light on said medium, (c) means for directing a beam of electrons upon said medium to produce such charges in said medium, (d) means to deflect an electron beam over said medium in one direction in successive lines at an intermediate frequency rate and in another direction perpendicular to said one direction at a low frequency rate to form a raster thereon consisting of a frame of two fields, the lines of one field of which are interlaced with the lines of the other thereof, (e) means for deflecting said beam of electrons in said one direction over said medium by a fixed high frequency carrier wave modulated in amplitude by an electrical signal corresponding to the point by point intensity of a primary color component in an image to be projected to form a diffraction grating thereon having lines of deformation directed in said other direction, (f) means for deflecting said beam of electrons in said one direction over said medium by another fixed high frequency carrier wave modulated in amplitude by another electrical signal corresponding to the point by point intensity of another primary color component in an image to be projected to form another diffraction grating thereon having lines of deformation directed in said other direction, (g) a mask having a set of transparent and opaque portions, means for imaging light from said beam of said one and other primary colors through said medium onto the opaque portions of said mask in the absence of deformations in said modulating medium, the transparent portions of said set being positioned to pass light of said one and other primary colors when corresponding diffraction grantings are formed in said medium in response to corresponding electrical signals, the depth of deformations of each of said gratings corresponding to the intensity point by point of the respective color component of the image to be projected, (h) said one and other fixed carrier frequencies each being different and many times greater than said intermediate frequency, the phase of each of said fixed frequency carrier waves being synchronized with each line deflection such that the same phase of each of said carrier waves occurs on corresponding parts of each line of deflection, (i) means for reversing the phase of one of said one and said other fixed frequency waves in alternate fields of scan.

References Cited

UNITED STATES PATENTS

| | | | |
|---|---|---|---|
| 3,078,338 | 2/1963 | Glenn | 178—5.4 |
| 3,134,852 | 5/1964 | Glenn et al. | 178—5.4 |
| 3,209,072 | 9/1965 | Glenn | 178—5.4 |
| 3,272,917 | 9/1966 | Good et al. | 178—5.4 |

OTHER REFERENCES

McIlwain et al., Principles of Color Television, Wiley, New York, 1956, pp. 129–134 relied upon.

JOHN W. CALDWELL, *Acting Primary Examiner.*

J. A. O'BRIEN, *Assistant Examiner.*